United States Patent [19]
Battlogg

[11] Patent Number: 5,588,173
[45] Date of Patent: Dec. 31, 1996

[54] WINDSHIELD WIPER SYSTEM WITH ELECTRIC MOTOR

[76] Inventor: Stefan Battlogg, Haus Nr. 26, A-6771 St. Anton i/M, Austria

[21] Appl. No.: 313,028

[22] PCT Filed: Mar. 22, 1993

[86] PCT No.: PCT/AT93/00054

§ 371 Date: Nov. 23, 1994

§ 102(e) Date: Nov. 23, 1994

[87] PCT Pub. No.: WO93/18944

PCT Pub. Date: Sep. 30, 1993

[30] Foreign Application Priority Data

Mar. 23, 1992 [AT] Austria ..................... 586/92

[51] Int. Cl.⁶ ............... B60S 1/08; B60S 1/34
[52] U.S. Cl. .......... 15/250.3; 15/250.34; 310/89; 310/83
[58] Field of Search ............. 15/250.3, 250.31, 15/250.13, 250.12, 250.21, 250.22, 250.34; 310/89, 83, 67 R, 36, 37, 38, 40.5, 85

[56] References Cited

U.S. PATENT DOCUMENTS

| | | | |
|---|---|---|---|
| 3,070,733 | 12/1962 | Ziegler | 318/135 |
| 3,978,542 | 9/1976 | van Eekelen | 15/250.3 |
| 4,405,887 | 9/1983 | Tamura et al. | 15/250.12 |
| 4,665,488 | 5/1987 | Graham et al. | 15/250.12 |
| 4,866,357 | 9/1989 | Miller et al. | 318/443 |

FOREIGN PATENT DOCUMENTS

| | | | |
|---|---|---|---|
| 531793 | 3/1993 | European Pat. Off. | |
| 646852 | 11/1928 | France | 15/250.3 |
| 225108 | 7/1985 | German Dem. Rep. | |
| 721207 | 5/1942 | Germany | 15/250.3 |
| 1160746 | 1/1964 | Germany | 150/250.12 |
| 2439996 | 8/1976 | Germany. | |
| 3705441 | 8/1987 | Germany. | |
| 3744155 | 7/1989 | Germany. | |
| 4104565 | 8/1991 | Germany. | |
| 4021669 | 2/1992 | Germany. | |
| 2286452 | 2/1991 | Japan. | |
| 2225218 | 5/1990 | United Kingdom. | |

*Primary Examiner*—Gary K. Graham
*Attorney, Agent, or Firm*—Herbert L. Lerner; Laurence A. Greenberg; Werner H. Stemer

[57] ABSTRACT

In a windscreen wiper system with a wiper arm pivotally mounted and a drive causing the wiper arm to pivot. The drive has a reversible electrical motor and a control unit which switches the electrical motor. The motor has a housing in two sections. The first section can be mounted immovably in relation to the vehicle and includes the stator portion. The second section of the housing can turn in relation to the first, includes the rotor portion, and is connected to the wiper arm. The rotating second section of the housing is preferably provided with a bearing sleeve which is mounted on an axial supporting lug of the first section of the housing.

17 Claims, 5 Drawing Sheets

WINDSHIELD WIPER SYSTEM WITH ELECTRIC MOTOR

BACKGROUND OF THE INVENTION

Field of the Invention

The invention relates to a windshield wiper system with a pivotably support wiper arm and a drive that swivels the wiper arm, the drive having a reversible electric motor mounted solidly to the vehicle and a control unit that switches the electric motor.

The windshield wiper systems are typically driven by an electric motor whose direction of rotation is converted, via a gear and a crank into a back-and-forth motion of the wiper arm. Each crank drive is designed for a certain wiping angle, and adaptations to changing environmental and operating conditions are hardly possible, or can be achieved only at major expense. Yet a windshield wiper system should be adapted to a relatively large number of different parameters, some of which cannot be made even to agree with one another, which would include for instance the wiper speed, the size of the field swept by the wipers, the parking position, the friction of the wiper blade on the wind shield, acceleration and deceleration values in the reversal region, and so forth. To avoid an overload from snow and the like, DE-A 41 04 565 discloses a wiper system of the type referred to at the output, in which a premature reversal of motion occurs if an overload is ascertained.

SUMMARY OF THE INVENTION

It is therefore the object of the invention to improve a windshield wiper system further, and in order to better meet the existing demands, it proposes that the electric motor has a two-part housing, both parts of which are rotatable relative to one another, and that a first housing part includes the stator portion of the electric motor and is mountable solidly to the vehicle, and the second housing part includes the rotor portion and is connected to the wiper arm.

The use of a two-part housing for the reversible electric motor has constructional advantages above all, since the second housing part driven by the motor can be associated directly with the wiper arm. Components such as crank drives, mounts and the like become unnecessary, saving space, and the assembly is simplified.

In a first embodiment, it is provided that connected to the second housing part is a bearing sleeve, which is supported on a supporting lug that is disposed on the housing part that is solidly mounted to the vehicle. As a result, the drive mechanism and wiper arm support form a simple, easily mounted structural unit. In a preferred embodiment, the housing part mountable solidly to the vehicle is embodied as cup-shaped, and the second housing part that is provided with the rotor portion is embodied as lidlike. In that case, the cup wall preferably has the stator portion of the electric motor.

The windshield wiper system becomes especially compact if the stator portion is provided on the supporting lug, and the second housing part is embodied as cup-shaped and forms an outer rotor portion, or if the motor power take-off shaft forms the bearing sleeve of the wiper arm. In both embodiments, the motor surrounds the supporting lug, which is fixed to the base body.

If the motor power take-off shaft is not the bearing sleeve of the wiper arm, then a further preferred embodiment provides that an intermediate gear is embodied between the motor power take-off shaft and the bearing sleeve. With respect to the pivoting angle of the wiper arm, the rotational angle of the electric motor becomes greater as a result in the gear ratio of the intermediate gear, and can be adjusted more exactly. This gear may be a spur gear, preferably a planetary gear. Moreover, the requisite drive moment of the electric motor decreases, so that the motor can be made smaller. A space-saving accommodation can be attained if the cup wall of the housing part that is mountable solidly to the vehicle, or the outer rotor portion, is provided with the ring gear of a planetary gear, and the second housing part has a supporting flange for the planet wheels.

A further embodiment provides that the supporting lug is disposed axially adjustably on the housing part that is mountable solidly to the vehicle. This makes it possible to design windshield wiper systems in which the wiper arm can be deployed from an indented parking position, in which a parameter such as the contact force of the wiper blade can be varied by means of the axial displacement, or in which by means of the axial displacement a switchover between the wiper motion in the working position and swiveling into a parking position, for instance, can be attained.

The axial displacement can be done arbitrarily, for instance by means of an electric motor, an electromagnet, a memory-effect spring, via a pressure medium, etc, and this can also be controlled by the drive control unit. The restoration to the initial position can be done via the wiper drive mechanism or via a restoring spring.

For the aforementioned switchover of the pivoting between the working position and the parking position, a preferred embodiment provides that an axially adjustable pawl is provided on the supporting lug, which pawl in a first position connects the supporting lug to the housing part that is mountable solidly to the vehicle and in a second position connects the supporting lug to the bearing sleeve, in both cases in a manner fixed against relative rotation. As a result, the electric motor of the wiper drive mechanism can move the wiper arm back and forth over the required wiping angle and can move it into the parking position via another, arbitrarily selectable angle.

Preferably, the control circuit of the electric motor includes fuzzy logic, and optionally also includes a neural network. The windshield wiper system can then be capable of adapting itself better and better to existing parameters and to the operating conditions that arise.

In particular, by means of the invention, windshield wiper systems can be achieved in which the wiper blade rotates relative to the wiper arm, while the wiper arm swivels over the windshield and in the process changes its position, so that the wiper blade is guided at least approximately parallel, and the swept area of the windshield wiper is rectangular to trapezoidal, depending on the shape of the windshield. In windshield wiper systems of this kind, a harmonious wiper blade movement can be attained if it is slowed down toward the reversal regions and accelerated again after the reversal. For that purpose, the electric motor is advantageously supplied with current pulses in very small increments, whose size is variable and which are defined by the control unit. The embodiment of a planetary gear between the motor power take-off shaft and the bearing sleeve brings additional advantages here, since the drive can be refined still further by the increased number of angular increments.

The control unit can take the following fixed and variable magnitudes: the length and change in length of the wiper arm; angle and change in angle of the wiper blade relative to the wiper arm; contact force and change in contact force of the wiper blade as a function of the vehicle speed and the wiper blade speed; wiping angle and change in wiping angle; angle of pivoting to the parking position; angular speed and change in angular speed of the wiper arm; forces of wiper system inertia, and changes therein; friction and changes in friction between the windshield and the wiper blade; wiping interval and changes in the wiping interval; etc. The invention will now be described in further detail, in conjunction with the figures of the accompanying drawings, but without being limited thereto.

DESCRIPTION OF THE PREFERRED EMBODIMENTS

Figure 1:
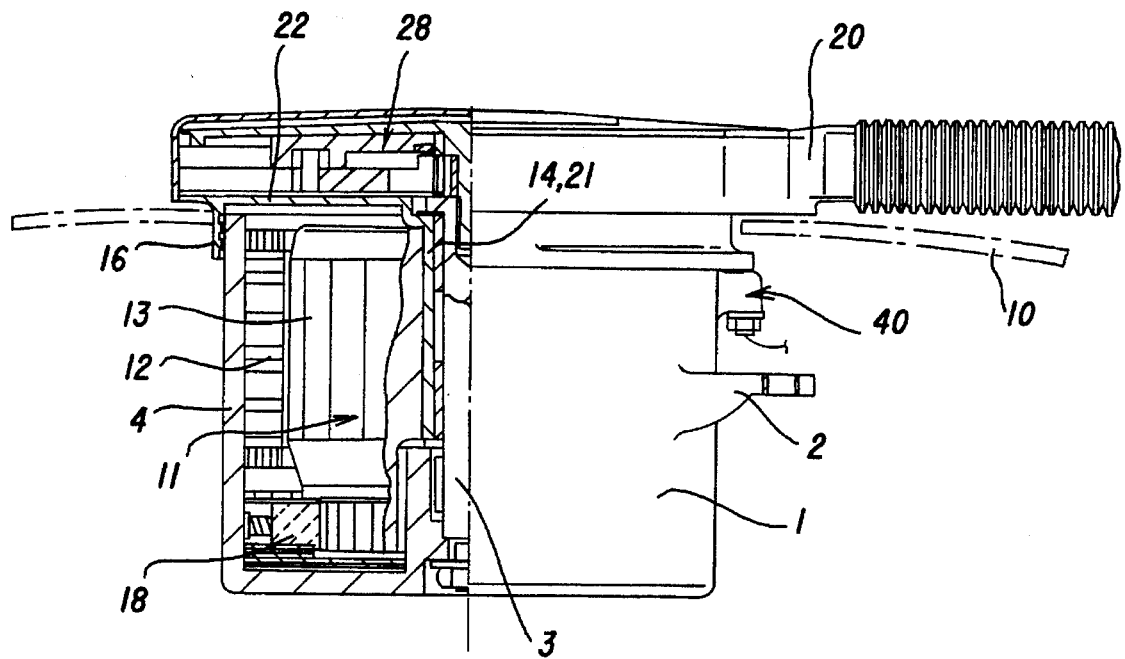
FIGS. 1–8 are fragmentary axial sections through various exemplary embodiments of the windshield wiper system according to the invention.

A windshield wiper system has a wiper arm 20 with a wiper blade, and the wiper arm has a bearing part 28 provided with a bearing sleeve 21. The bearing sleeve 21 is disposed on a supporting lug 3 that protrudes upright centrally from a first housing part 1. The first housing part 1 is provided with assembly straps 2, by means of which it is mountable inside the vehicle body 10 in a manner solidly connected to the vehicle. An electric motor 11, which in particular is a direct current motor, has a hollow shaft as its power take-off shaft 14, which is coaxial with the supporting lug 3 so that the electric motor surrounds the supporting lug 3. A rotational angle detector 40 is associated with the electric motor 11, and by way of it the magnitude of the rotational angle and the respective reversal points are determined. The bearing part 28 forms a gear housing for a control gear of the wiper arm 20. The control gear converts a relative rotation between the bearing part 28 of the wiper arm 20 and a part joined to the supporting lug 3 and protruding into the gear housing into a change in length of the wiper arm 20 and a rotation of the wiper blade, so that the wiper blade sweeps essentially the entire area of a windshield. The embodiment of the wiper arm 20 is not essential to comprehension of the present invention, however, and so it need not be described in further detail. The bearing sleeve 21 can therefore be provided on any other embodiment of a swivelable wiper arm as well.

In the embodiment of FIG. 1, the first housing part 1 is cup-shaped, and the cup wall 4 carries the stator portion 12 of the electric motor 11. Brushes 18 are provided in the region of the bottom. The rotor portion 13 of the electric motor 11, in this embodiment, is fixed to the bearing sleeve 21, which therefore at the same time acts as the power take-off shaft 14. The bearing sleeve 21 carries a flange, which as the second housing part 22 forms a lid, provided with a sealing flange 16, of the first, cup-shaped housing part 1 and is rotatable relative to the first housing part 1. The second housing part 22 is therefore rotated by the motor and therefore simultaneously forms the bottom of the bearing part 28 that is connected to the wiper arm 20. The rotational angle detector 40 is located on the outside of the first housing part 1, between the cup wall 4 and the second housing part 22 that forms the lid.

Figure 2:
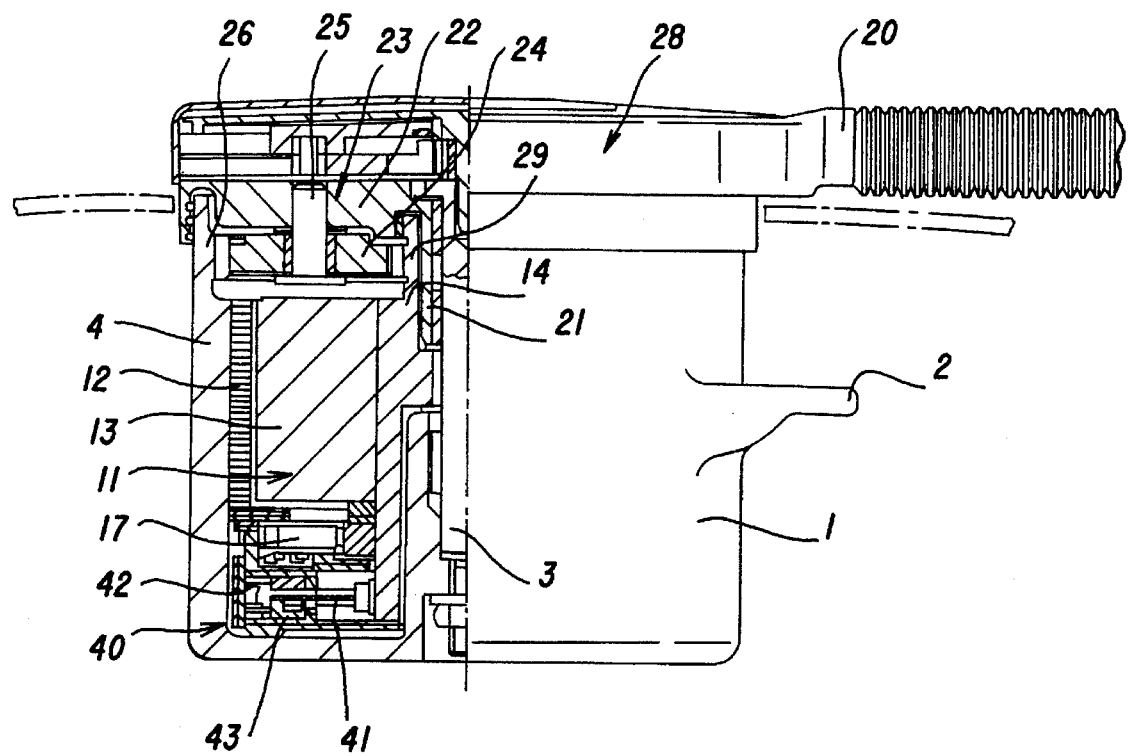

In the embodiment of FIG. 2, a planetary gear 23 is embodied between the power take-off shaft 14 of the motor and the bearing sleeve 21. The bearing sleeve 21 is disposed coaxially inside the power take-off shaft 14 and is provided with the second housing part 22, which forms the bottom of the bearing part 28 and the lid of the first housing part 1 and in which axles 25 are disposed that carry planet wheels 24. The power take-off shaft 14 forms the sun wheel of the planetary gear, and the cup wall 4 is provided with the internal gear wheel or ring gear 26. A gear ratio of 1:4 to 1:5, for instance, makes it possible to multiply the rotational angle of the electric motor 11 by a factor of 4 or 5 relative to the wiping angle, so that the control of the electric motor can be refined. The electric motor 11 can moreover be switched electronically and includes not brushes but rather Hall sensors 17. The rotational angle detector 40 is disposed in the interior of the first housing part 1 and includes a perforated element 41, rotating with it, and a light source 42 and a light sensor 43. The remaining layout is equivalent to that of the embodiment of FIG. 1.

Figure 3:
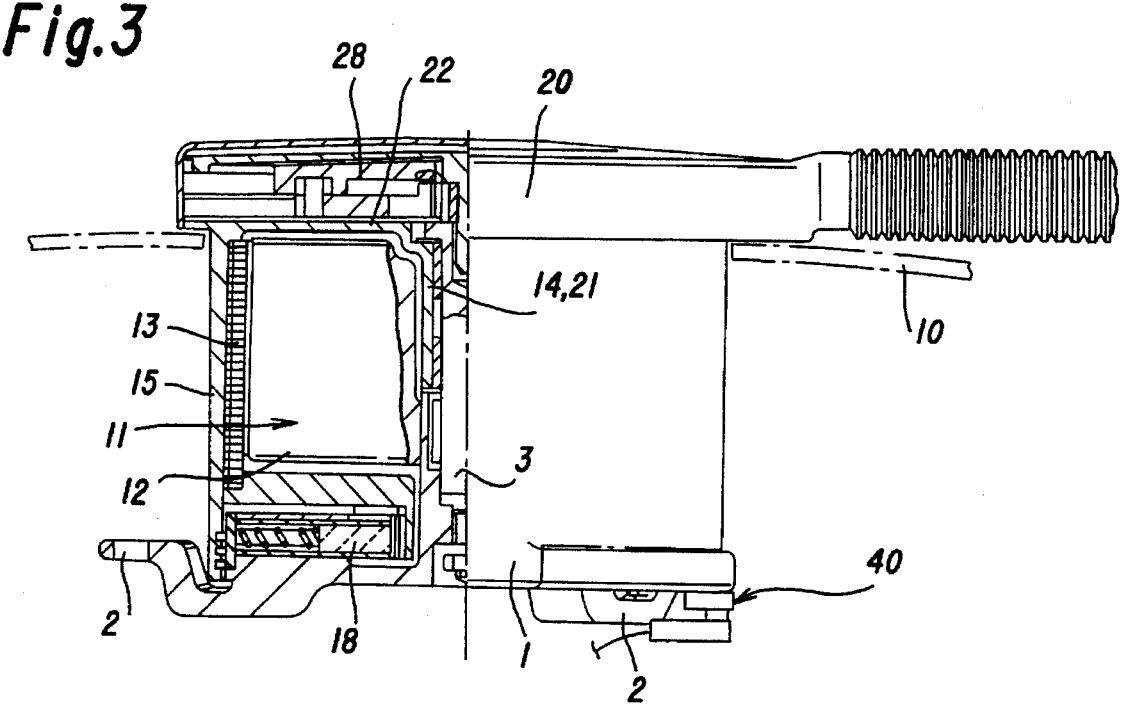

FIG. 3 shows an embodiment that as in FIG. 1 is embodied without a planetary gear. The difference is that the second housing part 22, forming the bearing part 28, is cup-shaped and has both a bottom, on the middle of which the bearing sleeve 21 is provided, and an outer wall 15. The outer wall 15 carries the rotor portion 13 of the electric motor 11, whose stator portion 12 is retained in a manner fixed against relative rotation on the supporting lug 3. The first housing part 1 takes the form of a plate, which embodies the sealingly inserted lid, which is mountable solidly to the vehicle, of the cup-shaped second housing part 22. In this embodiment as well, it is possible to incorporate a planetary gear 23.

Figure 4:
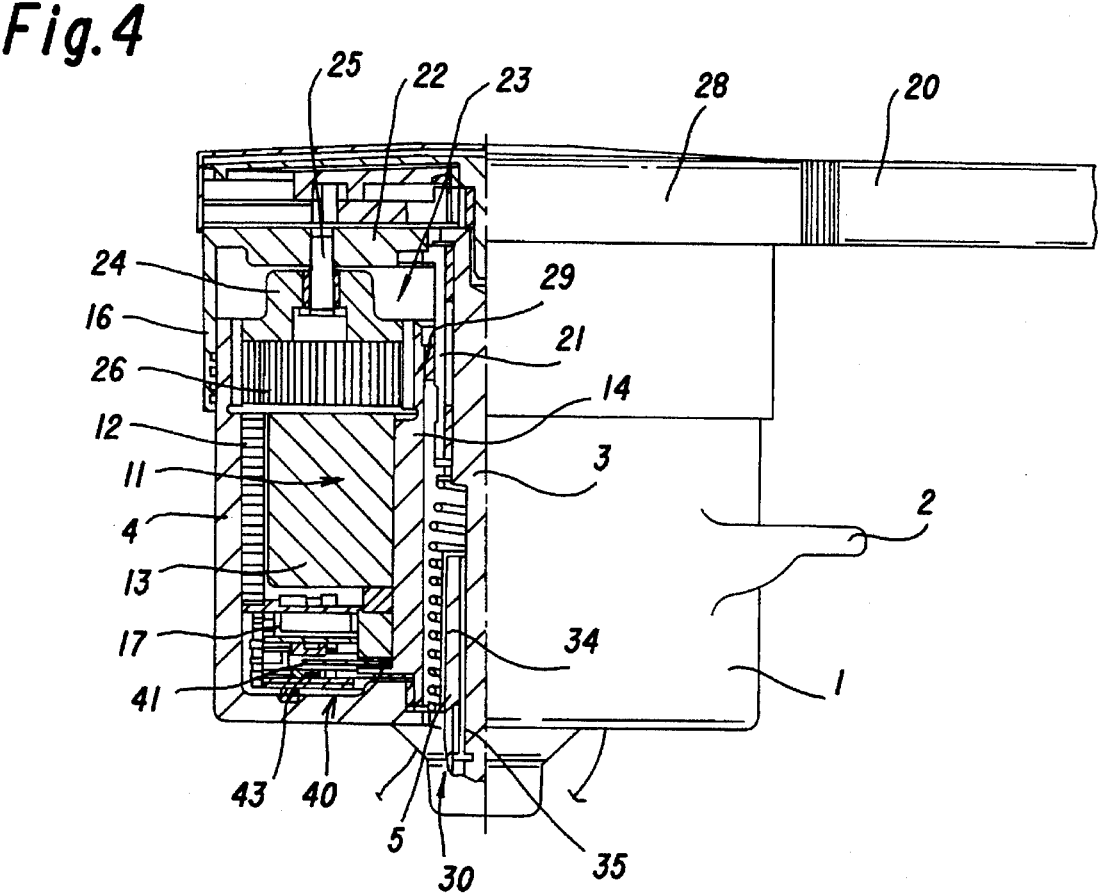
Figure 5:
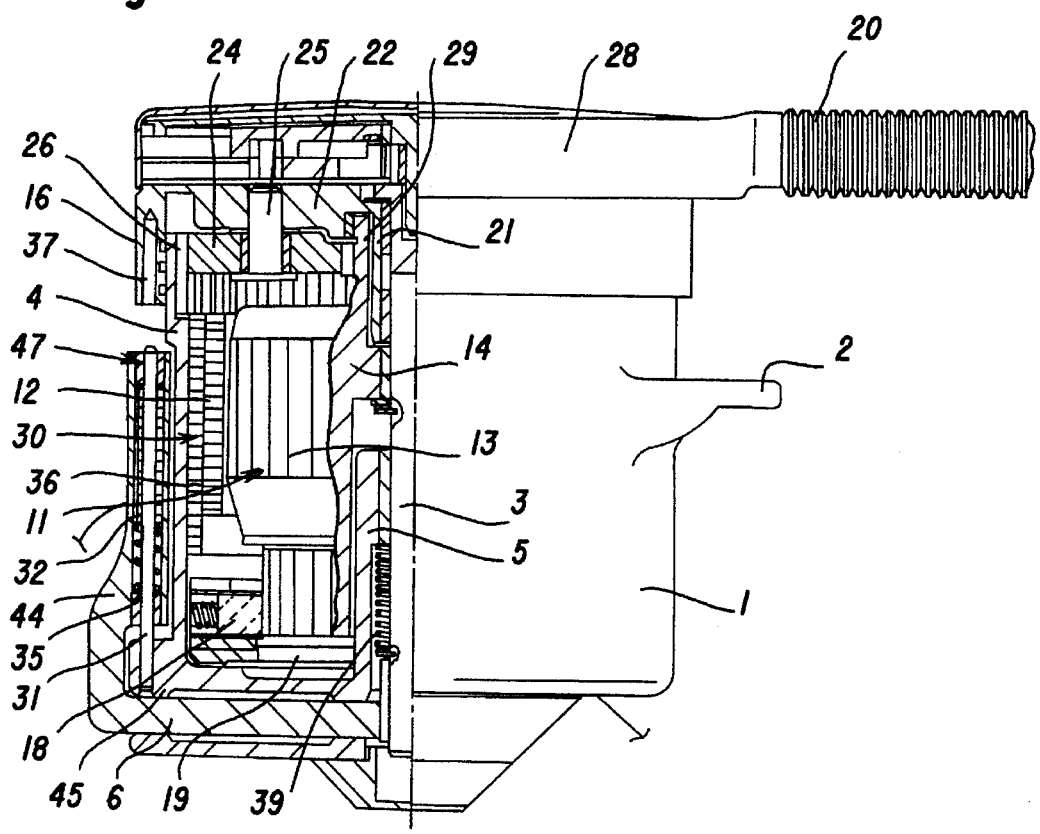

In FIG. 4, an embodiment is shown in which the supporting lug 3 is axially adjustable, and so the wiper arm 20 can be raised, for instance from an indentation in the vehicle body 10. The first housing part 1, which is again cup-shaped as in FIGS. 1 and 2, has a central sleeve 5, in which the supporting lug 3 is supported. Its actuation is effected by means of an actuating drive 30, which in this embodiment is formed by a heatable spring 34 with shape memory capability and by a counterpart spring 35. The spring 34 may be used either for the stroke or for the return. The actuating drive 30 may be embodied in any arbitrary way, however, and may for instance include an electric motor, a lifting magnet, a pressure-fluid actuation means, etc. The remaining layout of this embodiment is essentially equivalent to that of the embodiment of FIG. 2; the sealing flange 16, the internal gear wheel 26 and the toothing of the sun wheel 29 on the power take-off shaft 14 have a greater height than the stroke or the displacement travel, as applicable.

FIGS. 5–8 show embodiments of the windshield wiper system that have an adjustable-length wiper arm 20, which in its shortest length can be transferred to a parking position located outside the field swept by the windshield wiper.

In the embodiment of FIG. 5, which again shows the raised position, the supporting lug 3 is again supported displaceably in the central sleeve 5 of the cup-shaped first housing part 1; the actuating drive 30 shown here includes an electromagnetic lifting device 36, which is disposed on the cup-shaped wall 4 of the first housing part 1 coaxially with the stator portion 12 and acts upon the rotor portion 13 of the electric motor 11, which is axially displaceably connected to the supporting lug 3. A restoring spring 39 acts counter to the lifting device 36. The toothing of the sun wheel 29 on the power take-off shaft 14 does not require an increased height, because after all the power take-off shaft 14 is displaced jointly with the bearing sleeve 21 and the planet wheels 24; instead, a free space 19 is made available underneath the rotor portion 13. For transferring the wiper arm 20 to the parking position, a second actuating drive 47 is provided. It includes a cantilever arm 6, which is joined to the supporting lug 3 in a manner fixed against relative rotation but is not displaceable with it, and which is extended to the outside through a slit in the first housing part 1. The cantilever arm 6 has a sleeve 44, extending parallel outside the cup wall 4, in which a lifting magnet 32 and a locking pin 31 are disposed. A continuous 45 of the first housing part 1 has a bore that in the wiping position of the wiper arm 20 is aligned with the locking pin 31, and which is engaged by the locking pin 31 in the wiping position and fixes the supporting lug 3 solidly to the base body and hence solidly to the vehicle. For the transfer to the parking position, the locking pin is released from the continuation 45 by means of the lifting magnet 32 and introduced into a bore 37 of the sealing flange 16. This is done in a position of the wiper arm 20 in which the wiper arm has its shortest length, which is not changed in the ensuing pivoting into the parking position. The pivoting initiated by the electric motor 11 thus rotates the supporting lug 3 jointly with the bearing sleeve 21 and the second housing part 22, via the planetary gear 23, the locking pin 31 and the cantilever arm 6, so that the control gear contained in the bearing part 28 remains inoperative.

Figure 6:
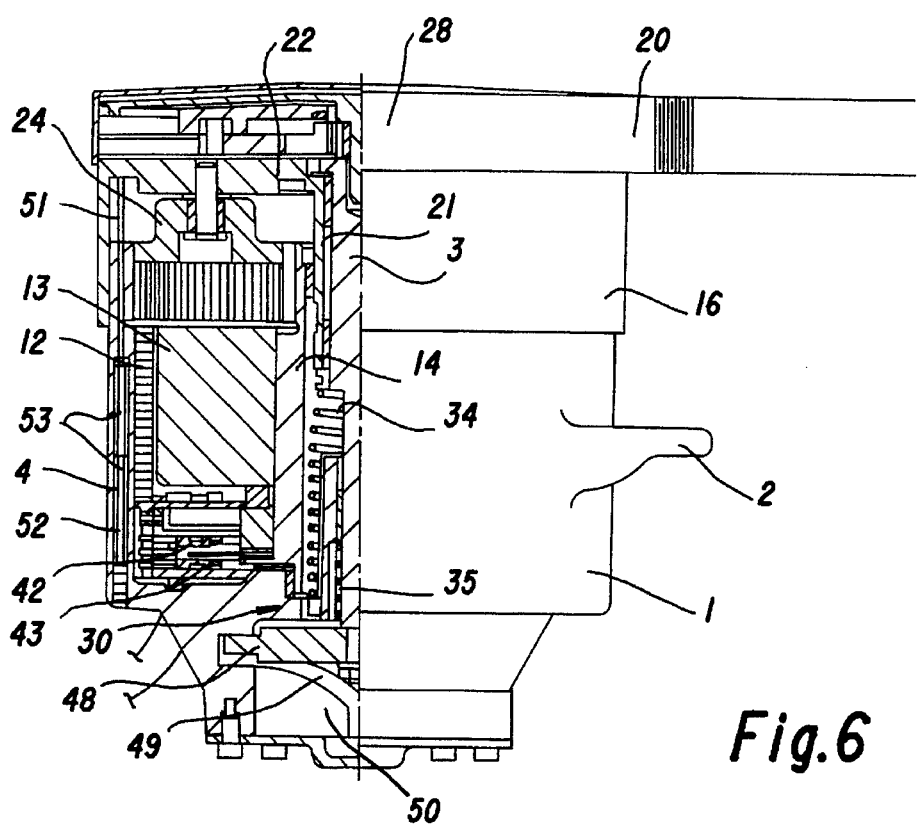

FIG. 6 shows a similar variant, in which the actuating drive 30 for the displacement of the supporting lug 3 again has a spring 34 with the capability of shape memory. An arm 48 is radially secured to the lower end of the displaceable supporting lug 3; this arm engages a groove 49, which rises helically over approximately 90°, in the recess 50 of the first housing part 1. The stroke of the spring 34 causes a rotation of the supporting lug 3, which in this embodiment, with the motor stop, would cause a change in length of the wiper arm 20. Since the stroke of the supporting lug 3 takes place only upon transfer of the wiper arm 20 from the parking position to the working position, during which the wiper arm length must remain the same, the stroke height is ascertained by a sensor 51, which rests on the flange or lid of the housing part 22 and is acted upon by a spring 52. The axial joint displacement of the sensor 51 is detected by measurement coils 53 and transmitted to the electric motor control unit, which in particular includes fuzzy logic. From the stroke of the sensor 51, the fuzzy logic calculates the rotational angle of the supporting lug 3 and triggers the electric motor 11, so that the bearing sleeve 21, the second housing part 22, the bearing part 28 and hence the wiper arm 20, via the planetary gear 23, are rotated synchronously with the supporting lug 3, until the terminal position of the arm 48 is reached. In both terminal positions, the groove 49 extends slightly axially, the result of which is the locking, in a manner fixed against relative rotation, of the supporting lug 3 to the first housing part 1, as is required for the change in length of the wiper arm 20 during the wiping motion.

Figure 7:
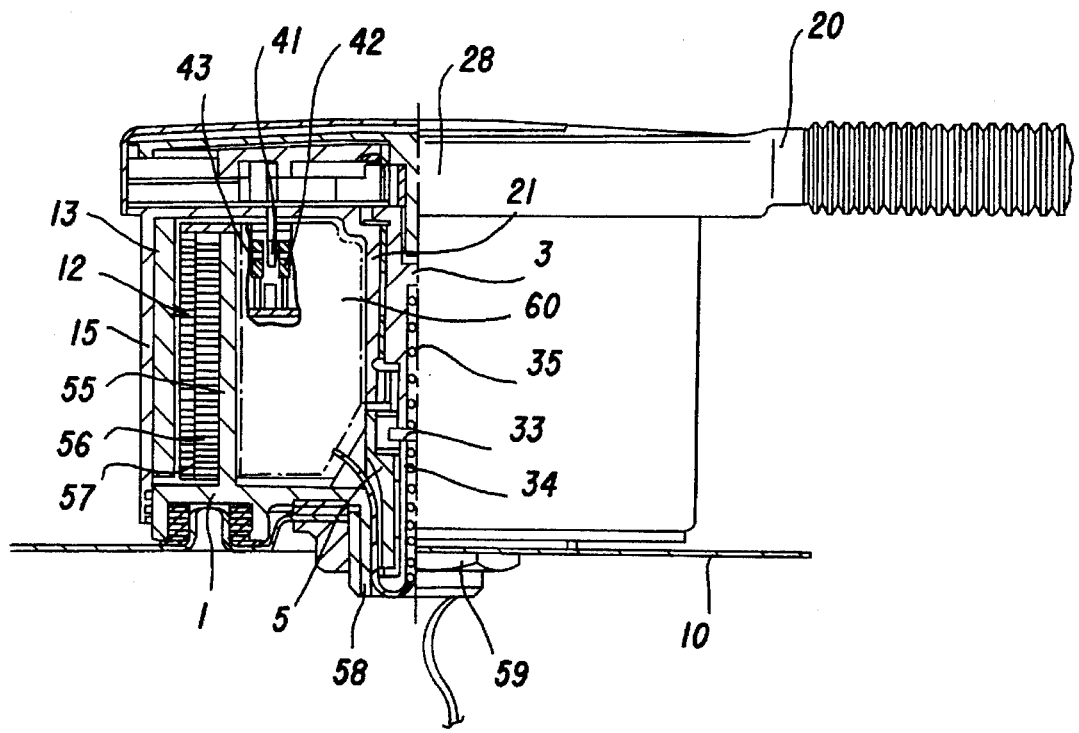

Two further embodiments, which have an actuating drive 47 for the switchover of the wiper drive mechanism between the working position and the parking position, are shown in FIGS. 7–10. In the embodiment of FIG. 7, the stator portion 12 of the electric motor 11, which has two windings 56, 57, is fixed to an annular wall 55 protruding upright from the first housing part 1. The rotor portion 13 is carried by the outer wall 15, which rotates jointly with the second housing part 22. Inside the annular wall 55, space remains for the rotational angle measurement by means of a stationary light source 42, a light sensor 43, and a perforated element 41 that rotates jointly with the flange or lid of the housing part 22, and also for the control unit 60, which in particular includes fuzzy logic. The two windings 56 and 57 are designed and disposed differently. By suitable triggering of the two windings, it becomes possible to adapt the generatable torque to the forces required. For example, a torque that is higher by a factor of up to 8 is required at the reversal positions of the wiper arm. By suitable embodiment of the windings 56 and 57, and three or more windings may also be provided, a smaller winding can thus be provided in the middle region of the swept field of the windshield, the smaller winding being reinforced toward both turning positions. In this embodiment, the assembly of the first housing part is effected by means of a central securing nut 59. To that end, the first housing part 1 has a middle bottom screw 58, which is passed through an opening of a part of the vehicle body 10 and fixed to the other side of the nut 59. In this embodiment, the supporting lug 3 is not supported axially displaceably, but only rotatably, in the central sleeve 5 of the first housing part 1. A locking pin 31 is axially displaceable in the supporting lug 3, and an actuating drive 30 is associated with this locking pin. The actuating drive 30, as in the embodiments of FIGS. 4 and 6, comprises a spring 34 with shape memory capability and a restoring spring 3, which acts upon a pawl 33 that is extended to a slit 7 of the supporting lug 3. Details of the adjustment will be described below in conjunction with FIGS. 9 and 10.

Figure 8:
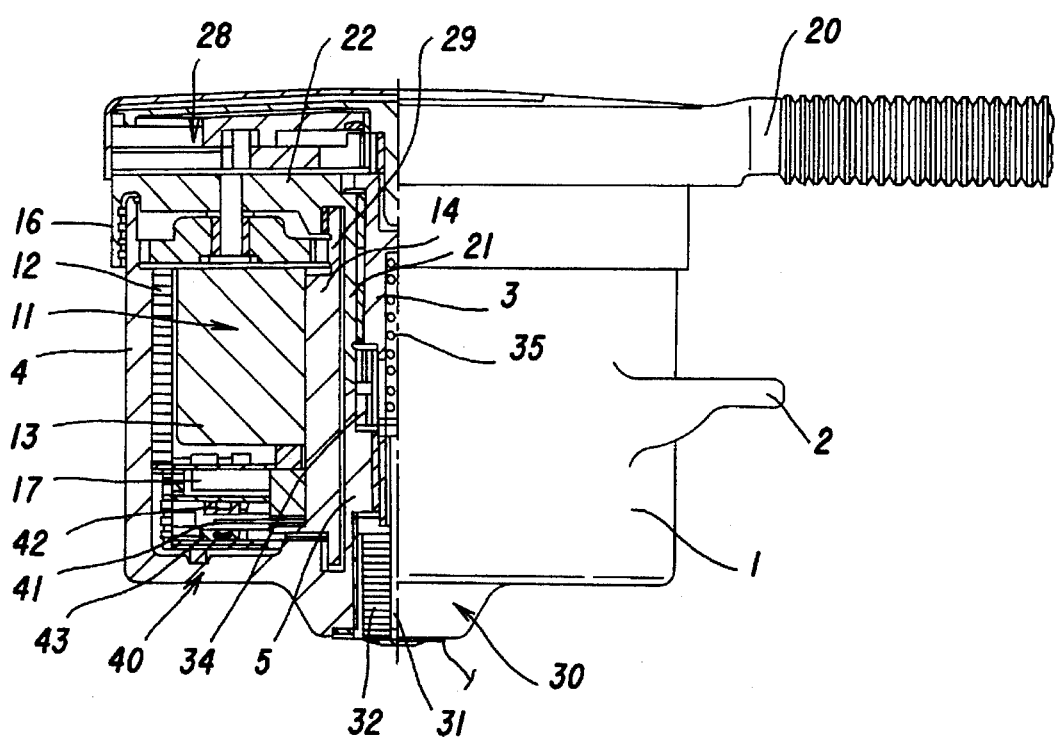
Figure 9:
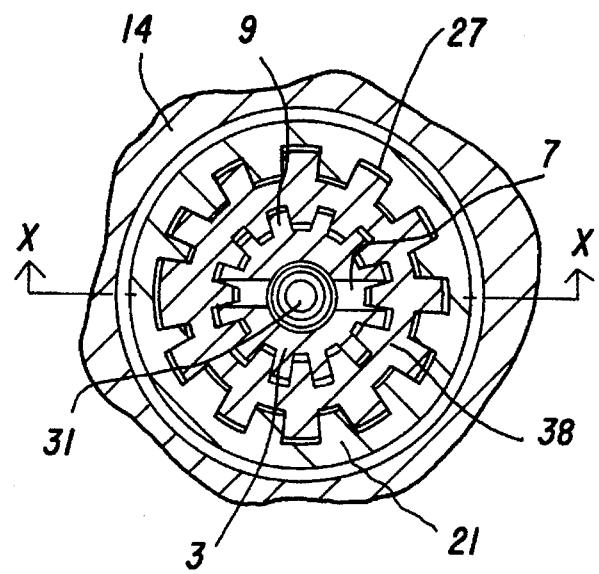
FIG. 9 is a section taken along the line IX—IX of FIG. 10, corresponding to the exemplary embodiments of FIGS. 7 and 8.
Figure 10:
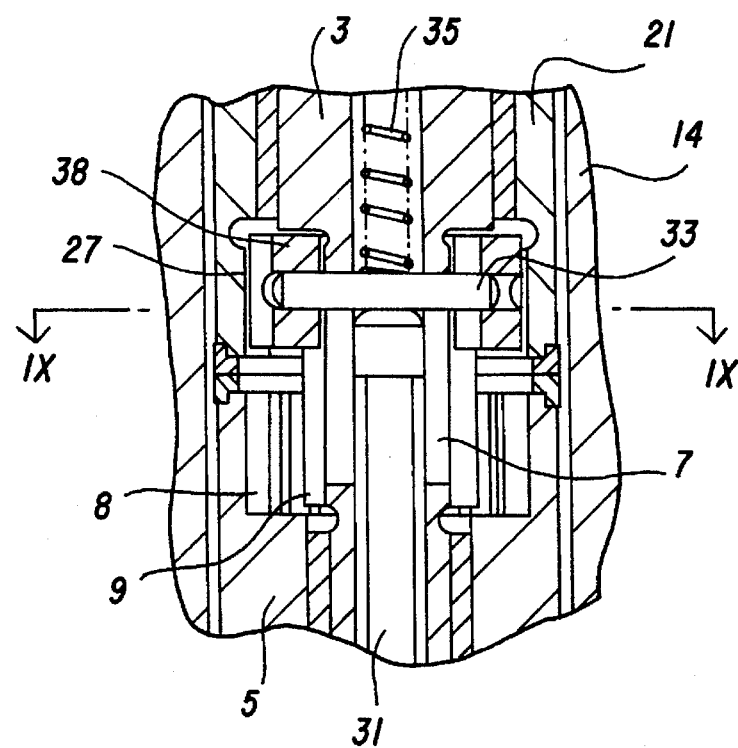
FIG. 10 is a section taken along the line X—X of FIG. 9.

In the embodiment of FIGS. 8–10, the supporting lug 3 is likewise supported only rotatably in the central sleeve 5, and a locking pin 31 is disposed axially displaceably in the supporting lug, and an actuating drive 30 is associated with the locking pin. The actuating drive 30 includes a lifting magnet 32, which acts upon the portion of the locking pin 31 that protrudes from the supporting lug 3, and a restoring spring 35 acting on the locking pin 31 in the opposite direction. A pawl 33 that passes through a diametrical slit 7 of the supporting lug 3 is likewise provided on the upper end of the locking pin 31. Both in the embodiment of FIG. 7 and in the embodiment of FIG. 8, the pawl 33 has a ring 38 with teeth on its outside and inside, which is displaceable with the locking pin 31. The internal toothing of the ring 38 slides into an external toothing 9 of the supporting lug 3. Widened portions are embodied in the upper end of the central sleeve 5 of the first housing part 1 and in the lower end of the bearing sleeve 21, and each widened portion carries one set of internal teeth 8 and 27. The supporting lug 3 is as a result joined in a manner fixed against relative rotation either to the central sleeve 5, or in other words to the first housing part 1 that is mountable solidly to the vehicle, or to the bearing sleeve 21 of the wiper arm 20, depending on the position of the ring 38. The pawl 33 can also penetrate the control pin 31, so that it is guided in compulsory fashion in both directions. The remaining layout of this embodiment is essentially equivalent to that of the embodiment of FIG. 1 or FIG. 2. Instead of the lifting magnet 32, a spring with shape memory capability can be used in this embodiment as well.

Various characteristics of the individual embodiments can also be employed in other embodiments.

For instance, each embodiment with an axial motion can have instead of a lifting magnet 32 a spring 34 with shape memory, an electric motor, an adjustment by means of a pressure medium, and so forth, and the adjusting drive and the restoring spring can also be transposed. The two or more than two windings 56, 57 described in conjunction with FIG. 7 can also be provided in the other embodiment. The planetary gear 23 may also be incorporated into all the embodiments. In the event that the direct blocking of the second housing part 22 with the wiper arm 20 is not possible for reasons of space, then the connection between the rotating second housing part 22 and the bearing part 28 of the wiper arm 20 can also be done via a steering arm, which transmits the rotary motion of the housing part 22 to the bearing part 28 supported on the vehicle body.

I claim:

1. In an automobile which includes a windshield wiper system for wiping a windshield, said system comprising:

a wiper arm pivotally supported on an automobile and drive means for pivoting said wiper arm, said drive means including a reversible electric motor stationarily mounted on the automobile and a control unit controlling said electric motor, said electric motor having a stator portion and a rotor portion;

a housing formed of a first housing part and a second housing part closing off said first housing part, said first housing part carrying said stator portion of said electric motor and being stationarily mounted on the automobile, said second housing part being drivingly connected to said rotor portion of said electric motor, being rotatable relative to said first housing part, and being non-rotatingly connected to said wiper arm.

2. The windshield wiper system according to claim 1, further comprising a bearing sleeve connected to said second housing part, and a supporting lug disposed on said first housing part and supporting said bearing sleeve.

3. The windshield wiper system according to claim 2, wherein said stator portion is provided on said supporting lug, and said second housing part is a cup-shaped housing part defining said rotor portion as an outer rotor portion.

4. The windshield wiper system according to claim 3, further comprising a planetary gear with a ring gear and planet wheels, said second housing part having a supporting flange formed thereon for supporting said planet wheels.

5. The windshield wiper system according to claim 4, wherein said ring gear is mounted on one of the cup wall of said first housing part and said rotor portion.

6. The windshield wiper system according to claim 2, wherein said electric motor includes a motor power take-off shaft, and said take-off shaft is formed by said bearing sleeve.

7. The windshield wiper system according to claim 2, wherein said electric motor includes a motor power take-off shaft, and including an intermediate gear disposed between and meshing with said motor power take-off shaft and said bearing sleeve.

8. The windshield wiper system according to claim 7, further comprising a planetary gear with a ring gear and planet wheels, said second housing part having a supporting flange formed thereon for supporting said planet wheels.

9. The windshield wiper system according to claim 8, wherein said ring gear is mounted on one of the cup wall of said first housing part and said rotor portion.

10. The windshield wiper system according to claim 2, wherein said supporting lug is disposed axially adjustably on said first housing part.

11. The windshield wiper system according to claim 2, further comprising an axially adjustable pawl disposed on said supporting lug, said pawl defining a first position in which said pawl non-rotatably connects said supporting lug to said first housing part and a second position in which said pawl non-rotatably connects said supporting lug to said bearing sleeve.

12. The windshield wiper system according to claim 1, wherein said first housing part is cup-shaped, and said second housing part is formed as a lid.

13. The windshield wiper system according to claim 12, wherein said stator portion is provided on a wall of said cup-shaped first housing part.

14. The windshield wiper system according to claim 13, further comprising a planetary gear with a ring gear and planet wheels meshing with said ring gear, said second housing part having a supporting flange formed thereon for supporting said planet wheels.

15. The windshield wiper system according to claim 14, wherein said ring gear is mounted on one of the cup wall of said first housing part and said rotor portion.

16. The windshield wiper system according to claim 1, wherein said control unit of said electric motor includes fuzzy logic.

17. The windshield wiper system according to claim 1, wherein said control unit of said electric motor includes a neural network.

* * * * *